United States Patent
Adams et al.

(10) Patent No.: US 11,846,231 B2
(45) Date of Patent: Dec. 19, 2023

(54) SYSTEM AND METHOD FOR PREVENTING ICING IN THE COMBUSTION INLET AIR PATH OF A GAS TURBINE SYSTEM

(71) Applicant: GENERAL ELECTRIC COMPANY, Schenectady, NY (US)

(72) Inventors: William Stanley Adams, New Braunfels, TX (US); Victor Alfonso Gonzalez Tellez, Queretaro (MX); Jametra Stitt, Houston, TX (US); Nileshpuri Goswami, Richmond, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/560,367

(22) Filed: Dec. 23, 2021

(65) Prior Publication Data

US 2023/0203990 A1 Jun. 29, 2023

(51) Int. Cl.
*F02C 7/052* (2006.01)
*F02C 7/055* (2006.01)

(52) U.S. Cl.
CPC .............. *F02C 7/052* (2013.01); *F02C 7/055* (2013.01); *F05D 2220/32* (2013.01); *F05D 2240/14* (2013.01)

(58) Field of Classification Search
CPC .. F02C 7/05; F02C 7/052; F02C 7/055; F05D 2220/32; F05D 2240/14
See application file for complete search history.

(56) References Cited

U.S. PATENT DOCUMENTS

| 9,040,145 B2 | 5/2015 | Lyons et al. |
| 9,067,679 B2 | 6/2015 | Scimone |

(Continued)

FOREIGN PATENT DOCUMENTS

| CN | 210031689 | 2/2020 |
| CN | 110863225 | 3/2020 |

(Continued)

OTHER PUBLICATIONS

Loud et al. "Gas Turbine Inlet Air Treatment", GE Power Generation, GER-3419A, https://www.ge.com/content/dam/gepower-new/global/en_US/downloads/gas-new-site/resources/reference/ger-3419a-gas-turbine-inlet-air-treatment.pdf.

(Continued)

*Primary Examiner* — Steven M Sutherland
(74) *Attorney, Agent, or Firm* — Grogan, Tuccillo & Vanderleeden, LLP

(57) ABSTRACT

A system and method for preventing icing in the combustion inlet air path of a gas turbine system. An air intake system of the gas turbine system supplies intake air to a gas turbine engine. The air intake system includes an air filter inlet house to filter the intake air. The air filter inlet house includes at least one filter stage having an array of pulse filters, with each of the pulse filters being hydrophobic. A combustion inlet air path is in fluid communication with the air intake system and the gas turbine engine. The combustion inlet air path receives the filtered air from the air filter inlet house and supplies the filtered air as combustion inlet air to an inlet of the gas turbine engine. A surface of at least one component in the combustion inlet air path includes an anti-icing coating to prevent ice from forming thereon.

9 Claims, 4 Drawing Sheets

(56) References Cited

U.S. PATENT DOCUMENTS

| | | | |
|---|---|---|---|
| 9,200,568 B1 * | 12/2015 | Kippel | B01D 46/60 |
| 9,546,280 B2 | 1/2017 | Nowak et al. | |
| 10,465,091 B2 | 11/2019 | Tuteja et al. | |
| 2006/0281861 A1 * | 12/2006 | Putnam | C09D 127/18 |
| | | | 106/13 |
| 2009/0241509 A1 | 10/2009 | Hogate | |
| 2013/0236322 A1 * | 9/2013 | Schmidt | F01D 5/288 |
| | | | 428/156 |
| 2014/0060774 A1 * | 3/2014 | Motakef | F02C 7/052 |
| | | | 165/48.1 |
| 2016/0061158 A1 | 3/2016 | Taylor | |
| 2016/0245178 A1 * | 8/2016 | Bhabhrawala | F01D 25/02 |
| 2018/0015403 A1 * | 1/2018 | Kippel | B01D 46/02 |

FOREIGN PATENT DOCUMENTS

| | | | |
|---|---|---|---|
| CN | 111482341 | 8/2020 | |
| EP | 2681259 | 1/2014 | |
| WO | WO-2015019096 A1 * | 2/2015 | F01D 15/10 |

OTHER PUBLICATIONS

European Search Report dated May 17, 2023 from corresponding European Application No. 22211615.4.

* cited by examiner

SYSTEM AND METHOD FOR PREVENTING ICING IN THE COMBUSTION INLET AIR PATH OF A GAS TURBINE SYSTEM

BACKGROUND

Technical Field

Embodiments of this disclosure relate generally to gas turbine systems, and more specifically, to a system and method for preventing icing in the combustion inlet air path of a gas turbine system.

Discussion of Art

Gas turbine engines are utilized globally for electric power generation or as mechanical drives for operating equipment under a variety of climatic conditions. Operation during cold ambient temperature and high humidity conditions can lead to icing problems in gas turbine systems in which gas turbine engines are utilized. For example, ice can plug the filtration system of an air intake system to a gas turbine engine causing a significant drop in pressure in the air intake system, which in turn, leads to performance loss (e.g., gas turbine power output deterioration). In extreme cases, there is even a possibility that ice pieces can get ingested into a first blade stage of a compressor in the gas turbine engine, which can cause damage and may lead to some blades becoming inoperable. Ice may also cause the disruption of compressor work because of excessive vibration, or surging by decreasing the inlet flow, all of which can reduce the operational efficiency of the gas turbine system. Consequently, gas turbine systems that are located in cold weather locations where icing conditions can exist are typically equipped with anti-icing systems that can heat the intake air before it enters the compressor of the gas turbine engine. These anti-icing systems, which can include inlet heating coils, can be costly to implement.

BRIEF DESCRIPTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

The various embodiments of the present invention are directed to providing a novel and nonobvious anti-icing approach for use with a gas turbine system utilizing a gas turbine engine without having to rely on an anti-icing system to heat the intake air. The solution provided by the various embodiments includes utilizing an array of hydrophobic pulse filters in the air filter inlet house of an air intake system to a gas turbine engine, along with at least one component in the combustion inlet air path between the air filter inlet house and the inlet of the gas turbine engine that has a surface with an anti-icing coating to prevent ice from forming. With this configuration, a pulse filter controller can be programmed to pulse the pulse filters to dislodge ice from the filters as conditions dictate. Further, employing pulse filters that are hydrophobic blocks liquid water from passing through to the combustion inlet air path and into the inlet of the gas turbine engine. Blocking liquid water from passing through to the combustion inlet air path prevents ice accretion on the components in the path that can arise in cold weather conditions.

Even though the hydrophobic pulse filters block water that can lead to icing in the combustion inlet air path, icing conditions can still develop due to humidity that moves through the combustion inlet air path. Operation during cold ambient temperatures and high humidity are conditions that can lead to icing problems in gas turbine systems in which gas turbine engines are utilized. In general, icing conditions can develop on components in the combustion inlet air path when ambient operating conditions include at least 70% humidity and a temperature that is below 40 degrees Fahrenheit (F). Applying an anti-icing coating to at least one component in the combustion inlet air path prevents ice from forming when operating conditions include at least 70% humidity and a temperature that is below 40 degrees F.

In one embodiment, a foreign object damage (FOD) screen is one component in the combustion inlet air path between the air filter inlet house and the inlet of the gas turbine engine that can have an anti-icing coating. A FOD screen, which collectively can include one or more one screen and an air sock, is typically used to protect the gas turbine engine from debris (e.g., weld slag) that could lead to damage (e.g., blade damage) if allowed to pass through into the gas turbine engine. The FOD screen, which is placed upstream of the inlet of the gas turbine engine, provides "last chance" protection against foreign object damage to the gas turbine engine. Icing conditions (i.e., at least 70% humidity and a temperature that is below 40 degrees F.) can lead to ice formation on the FOD screen. Ice on the FOD screen can lead to a differential pressure across the FOD screen. As differential pressure increases across the FOD screen, it reduces the air flow going through the gas turbine engine. This can affect turbine operation due to icing build up in the FOD screen. This icing build up in the FOD screen can eventually cause the turbine to shut down. Applying the anti-icing coating to the FOD screen transforms the screen to an icephobic FOD screen that inhibits the formation of ice that can lead to damage of the gas turbine engine and possible shut down of the turbine.

Other components in the combustion inlet air path between the air filter inlet house and the inlet of the gas turbine engine can have an anti-icing coating applied to a surface to prevent the formation of ice. These other components can include, but are not limited to, weather hoods mounted on the air filter inlet house that permit passage of a stream of inlet air and prevent weather elements from entering, the silencer that is used to reduce the "noise" associated with the stream of the combustion inlet air transmitted to the inlet of the gas turbine engine, the inlet plenum and inlet volute that supply the combustion inlet air to the inlet of the gas turbine engine, the inlet guide vanes that direct the combustion inlet air to the inlet of the gas turbine engine, and the inlet struts that support the combustion inlet air duct that supplies the combustion inlet air towards the inlet of the gas turbine engine. Applying an anti-icing coating to one or more of these components can complement the anti-icing coating applied to the FOD screen.

The configuration of the array of hydrophobic pulse filters along with at least one component in the combustion inlet air path between the air filter inlet house and the inlet of the gas turbine engine that has a surface with an anti-icing coating, allows the various embodiments of the present invention to eliminate the possibility of ice accretion in the combustion inlet duct. This allows the gas turbine engine to operate continuously during icing conditions. In addition, the configuration of the various embodiments obviates the need to utilize an anti-icing system to heat the intake air, thereby maximizing efficiency and cost effectiveness of the gas turbine system. Further, the configuration of the various embodiments is suitable for use with gas turbine systems that are already implemented with an anti-icing system. To this extent, the configuration of the various embodiments can be utilized to avoid parasitic loads that are associated with the use of these anti-icing systems.

In accordance with one embodiment, a system is provided. The system comprises a gas turbine engine; an air intake system to intake air for supply to the gas turbine engine, the air intake system comprising an air filter inlet house to filter the intake air, wherein the air filter inlet house includes at least one filter stage having an array of pulse filters, with each of the pulse filters being hydrophobic, and a combustion inlet air path in fluid communication with the air intake system and the gas turbine engine, the combustion inlet air path receiving the filtered air from the air filter inlet house and supplying the filtered air as combustion inlet air to an inlet of the gas turbine engine, wherein a surface of at least one component in the combustion inlet air path comprises an anti-icing coating to prevent ice from forming on the at least one component.

In accordance with another embodiment, a gas turbine system is provided. The gas turbine system comprises: a gas turbine engine; an air intake system to intake air for supply to the gas turbine engine, the air intake system comprising an air filter inlet house to filter the intake air, wherein the air filter inlet house includes at least one filter stage having an array of pulse filters, with each of the pulse filters being hydrophobic, a combustion inlet air path in fluid communication with the air intake system and the gas turbine engine, the combustion inlet air path receiving the filtered air from the air filter inlet house and supplying the filtered air as combustion inlet air to an inlet of the gas turbine engine; and a foreign object damage (FOD) screen in the combustion inlet air path between the air filter inlet house and the inlet of the gas turbine engine to prevent debris from entering the inlet of the gas turbine engine, wherein a surface of FOD screen comprises an anti-icing coating to prevent ice formation thereon.

In accordance with a third embodiment, a method for preventing icing in the combustion inlet air path of a gas turbine system having a gas turbine engine, an air intake system to intake air for supply to the gas turbine engine, and a combustion inlet air path to supply combustion inlet air to an inlet of the gas turbine engine is provided. The method comprises: filtering the intake air in the air intake system with an air filter inlet house including at least one filter stage having an array of hydrophobic pulse filters; supplying the filtered air as combustion inlet air to the inlet of the gas turbine engine; and applying an anti-icing coating to a surface of at least one component in a path of the combustion inlet air between the air filter inlet house and the inlet of the gas turbine engine to prevent ice from forming on the at least component.

In accordance with a fourth embodiment, a method for preventing icing in the combustion inlet air path of a gas turbine system having a gas turbine engine, an air intake system to intake air for supply to the gas turbine engine, and a combustion inlet air path to supply combustion inlet air to an inlet of the gas turbine engine is provided. The method comprises: filtering the intake air in the air intake system with an air filter inlet house including at least one filter stage having an array of hydrophobic pulse filters; supplying the filtered air as combustion inlet air to the inlet of the gas turbine engine; placing a foreign object damage (FOD) screen in a path of the combustion inlet air between the air filter inlet house and the inlet of the gas turbine engine; and applying an anti-icing coating to a surface of the FOD screen to prevent ice from forming thereon.

DRAWINGS

The present invention will be better understood from reading the following description of non-limiting embodiments, with reference to the attached drawings, wherein below:

DETAILED DESCRIPTION

Example embodiments of the present invention will be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. For like numbers may refer to like elements throughout.

This disclosure relates generally to gas turbine systems, and more specifically, to a system and method for preventing icing in the combustion inlet air path of a gas turbine system. As used herein, the combustion inlet air path of a gas turbine system extends from the ambient air at the air intake system of the gas turbine system to the first stage of the gas turbine compressor.

The various embodiments of the present invention prevent the formation of ice in the combustion inlet air path of a gas turbine system through the use of an array of hydrophobic pulse filters in the air filter inlet house of an air intake system to a gas turbine engine, along with at least one component in the combustion inlet air path between the air filter inlet house and the inlet of the gas turbine engine that has a surface with an anti-icing or icephobic coating to prevent ice from forming on the at least one component. The prevention of the formation of ice in the combustion inlet air path of a gas turbine system as described in the various embodiments is suitable for use with all types of gas turbine systems and gas turbine combustion systems utilizing turbomachinery regardless of their application (e.g., land-based, marine-based, and aviation based applications). Gas turbine systems and gas turbine combustion systems using turbomachines that include, but are not limited to, heavy frame industrial gas turbines, aeroderivative gas turbines, marine gas turbines, ammonia-fueled gas turbines, hydrogen-fueled gas turbines, aviation gas turbines, and general combustion turbines are non-limiting examples of systems that can have a need to prevent ice formation in the combustion inlet air path if deployed in cold weather locations, and thus, are applicable for use with the various embodiments.

Figure 1:
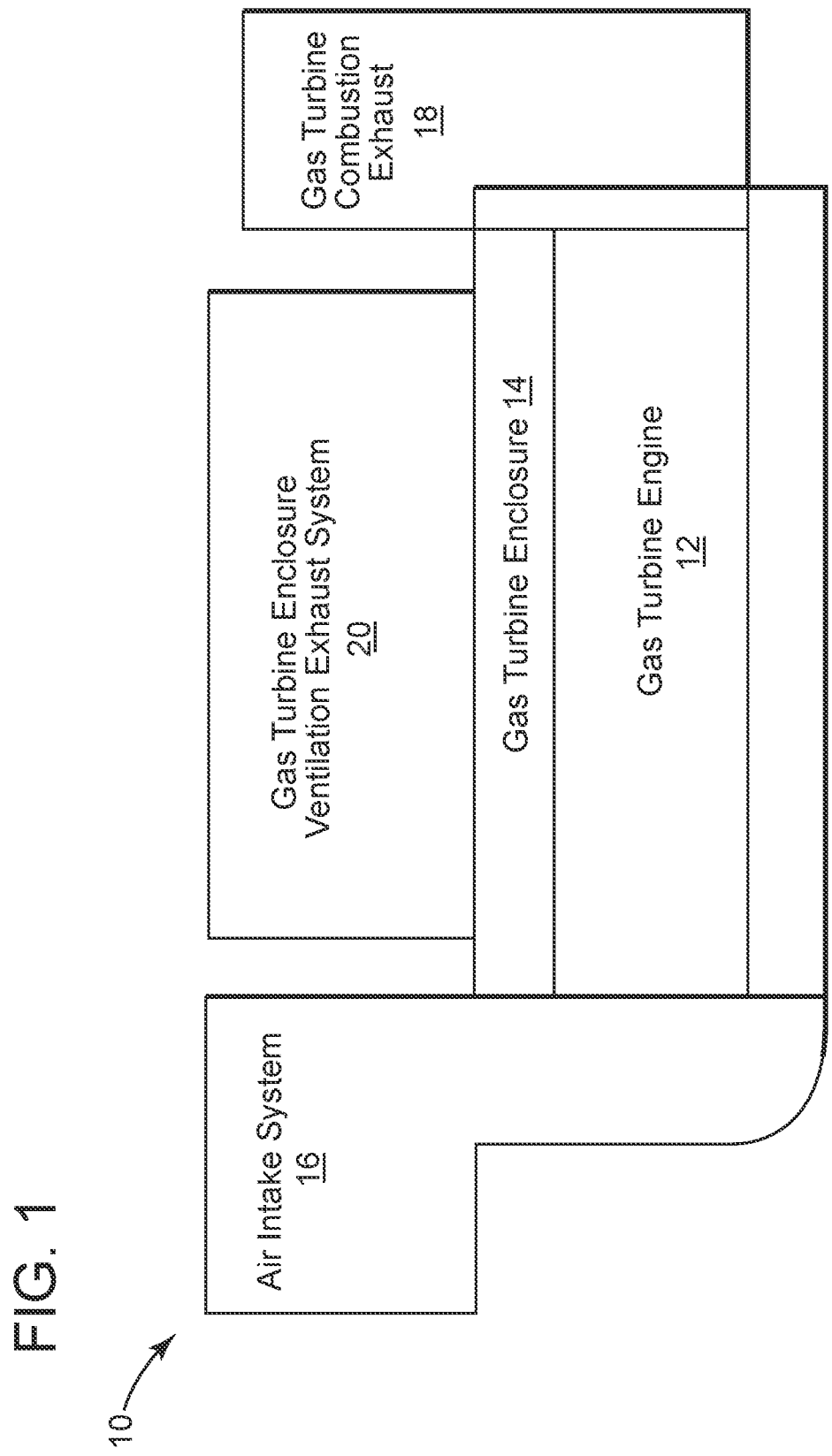
FIG. 1 shows a schematic block diagram of a gas turbine system in which a system for preventing icing in the combustion inlet air path of the gas turbine system can be implemented according to an embodiment of the invention.

Turning now to the figures, FIG. 1 shows a schematic block diagram of a gas turbine system 10 in which a system for preventing icing in the combustion inlet air path of the gas turbine system can be implemented according to an embodiment of the invention. As shown in FIG. 1, the gas turbine system 10 includes a gas turbine engine 12, a gas turbine enclosure 14 that houses the gas turbine engine 12, an air intake system 16 that provides filtered air to the gas turbine engine 12 for combustion, a gas turbine combustion exhaust 18 for releasing exhaust gases from the gas turbine engine 12, and a gas turbine enclosure ventilation exhaust system 20 to purge and ventilate heat and exhaust products from the gas turbine engine 12.

The gas turbine engine 12 can include a compressor, a combustor, and a turbine. In general, the compressor can compress an incoming flow of air. The compressor can deliver the compressed flow of air to the combustor, where the compressed flow of aft mixes with a compressed flow of fuel. The combustor can ignite the air/fuel mixture to create a flow of combustion gases. The flow of combustion gases can be delivered to the turbine to drive the turbine to produce mechanical work. The mechanical work produced in the turbine can drive the compressor and an external load, such as an electrical generator or the like. The flow of combustion gases may be exhausted or otherwise disposed by the gas turbine combustion exhaust 18.

The gas turbine engine 12 can use natural gas, various types of syngas, and/or other types of fuels. In addition, the gas turbine engine 12 may be any one of a number of different gas turbine engines such as those offered by the General Electric Company.

The gas turbine enclosure 14, which encloses the gas turbine engine 12, can isolate the gas turbine engine. In addition, the gas turbine enclosure 14 can include a number of different components that operate in conjunction with the gas turbine engine 12. For example, the gas turbine enclosure 14 can include piping for lube oil, NOx emissions, power augmentation, and the like. Other components can include, but are not limited to, a gas detection system and a fire detection and suppression system. Also, the gas turbine enclosure 14 can perform a number of different functions that contribute to the operation of the gas turbine engine 12. For example, the gas turbine enclosure 14 can serve as a sump for oil leaks from the gas turbine engine 12.

The air intake system 16 can include an inlet screen or an air filter inlet house that includes one or more filter assemblies having a number of inlet air filters that remove moisture and/or particulate matter (such as dust, dirt, contaminants and/or debris) from intake air channeled for supply to the gas turbine engine 12. A clean air duct can receive the filtered aft from the air filter inlet house. The air in the clean air duct can be divided into combustion inlet air that goes to the compressor of the gas turbine engine 12, and ventilation inlet air that is supplied to the gas turbine enclosure 14. In particular, a combustion inlet air duct can provide the combustion inlet air to the compressor, while a ventilation inlet air bypass conduit can supply the ventilation inlet air to the gas turbine enclosure 14.

The gas turbine enclosure ventilation exhaust system 20 can include one or more ventilation fans that operate to generate an air flow to purge the gas turbine enclosure 14 of heat and exhaust products from the gas turbine engine 12. In addition, the gas turbine enclosure ventilation exhaust system 20 can include a damper that controls the flow of air containing the heat and exhaust products from the gas turbine engine 12 and the gas turbine enclosure 14.

It is understood that the gas turbine system 10 can include a number of other components not depicted in FIG. 1. For example, the gas turbine system 10 can include a shaft operatively coupled to the compressor and turbine of the gas turbine engine 12. To this extent, the shaft may be connected to an electrical generator for power generation applications.

Figure 2:
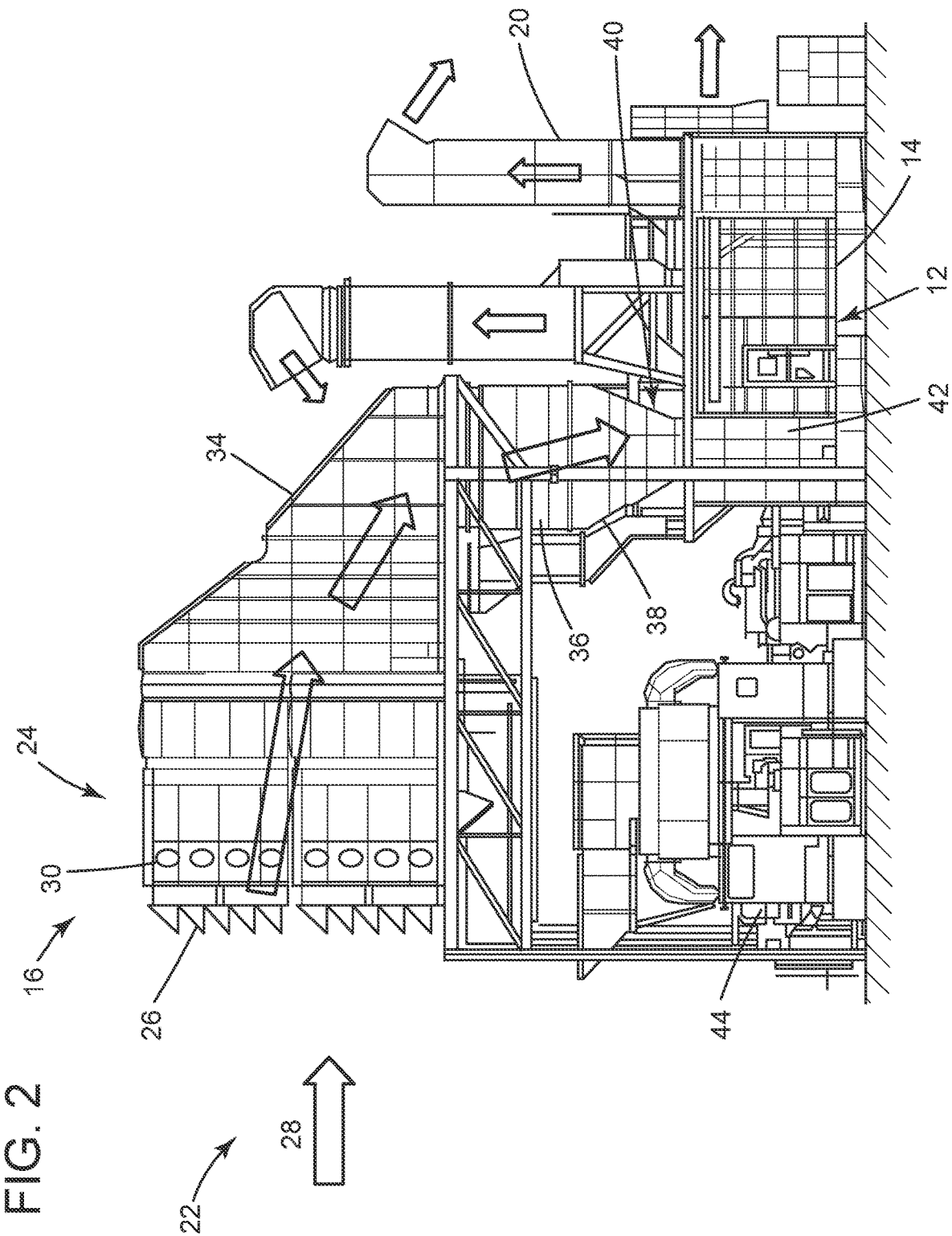
FIG. 2 shows an example of a gas turbine system in the form of an aeroderivative gas turbine system in which the system for preventing icing in the combustion inlet air path can be implemented according to an embodiment of the invention.

In one embodiment, the gas turbine system 10 depicted in FIG. 1 can take the form of an aeroderivative gas turbine system. FIG. 2 shows a schematic example of an aeroderivative gas turbine system 22, of which the system for preventing icing in the combustion inlet air path described herein can be implemented according to an embodiment of the invention. As used herein, "downstream" and "upstream" are terms that indicate a direction relative to the flow of a fluid, such as the working fluid through the gas turbine system, for example, the flow of air through the air intake system or through one of the components of a gas turbine engine. The term "downstream" corresponds to the direction of flow of the fluid, and the term "upstream" refers to the direction opposite to the flow.

As shown in FIG. 2, The aeroderivative gas turbine system 22 of FIG. 2 shows the air intake system 16 having an air filter inlet house 24. The air intake system 16 can further include a weather hood 26 mounted on the air filter inlet house 24 that permits passage of a stream of inlet air 28 and prevents weather elements such as rain, snow, and the like from entering therein. The weather hood 26 may be largely of conventional design, and can include a plurality of inlet vane type separators and moisture separators to prevent heavy rain or heavy fog mist from entering the air filter inlet house 24. For example, the inlet vane type separators can remove water droplet particles larger than a specified size (e.g., 5 microns in size) to prevent liquid droplets from carrying any absorbed salt downstream into the gas turbine engine 14. The moisture separators can remove water droplets particles that are smaller than the specified size. In particular, the moisture separators can collect smaller aerosol droplets and coalesce them into large droplets which can be easily removed with the help of the inertia of the larger droplets.

The air filter inlet house 24 can include a filter module 30 that can further remove moisture as well as particulate matter (such as dust, sand, dirt, salt, water droplets, contaminants, and/or debris) from the stream of inlet air 28 channeled to the gas turbine engine 12. In one embodiment, the filter module 30 can include a multiple of filter stages to filter the stream of inlet air 28 provided to the gas turbine engine 12. Note that for clarity, the filter module 30 of FIG. 2 only shows one filter stage.

Each of the filter stages in the filter module 30 can include any suitable filtering component that may be configured to remove and/or filter out large and small particles and/or debris that may be found in the stream of inlet air 28, such as, sand grains, dirt, dust, salt, rain drops, snow, and other undesirable debris and contaminants. In one embodiment, each of the filter stages in the filter module 30 can include an array of fabric filters such as hydrophobic pulse filters that can filter finer and/or smaller particulates from the stream of inlet air 28 flowing therethrough.

After passing through the air filter inlet house 24, the stream of inlet air 28 can then flow through a transition piece 34 that connects the air filter inlet house 24 to a silencer section 36 that can reduce the "noise" associated with the stream of inlet air 28 transmitted through the air intake system 16. The stream of inlet air 28 flows from the silencer section 36 to a foreign object damage (FOD) screen 40 via an inlet duct 38. The FOD screen 40, which collectively can include more than one screen, may be used to deflect contaminants or debris. The stream of inlet air 28 then may pass through an inlet plenum/volute 42 (a combustion inlet air duct) and into the gas turbine engine 12 as combustion inlet air for compression and combustion.

It is understood that the air intake system 16 can be configured to include other components, and thus, the description of the air intake system as depicted FIG. 2 as well as the other figures described herein is not meant to be limiting. For example, the air filter inlet house 24 can be configured with heating or de-icing components (e.g., heating coils) to warm the stream of inlet air 28 and/or components of the air filter inlet house 24 such as for example, the filter module 30. Sensors (e.g., temperature sensors, pressure sensors, humidity sensors, flow sensors, etc.) can measure various conditions associated with the air filter inlet house 24 and its components, as well as conditions associated with the stream of inlet air 28. Other components can include, but are not limited, to a by-pass duct that can divert clean, filtered inlet air from the inlet plenum 42 and supplies it as ventilation inlet air to a gas turbine enclosure 14 that encloses the gas turbine engine 12.

Figure 3:
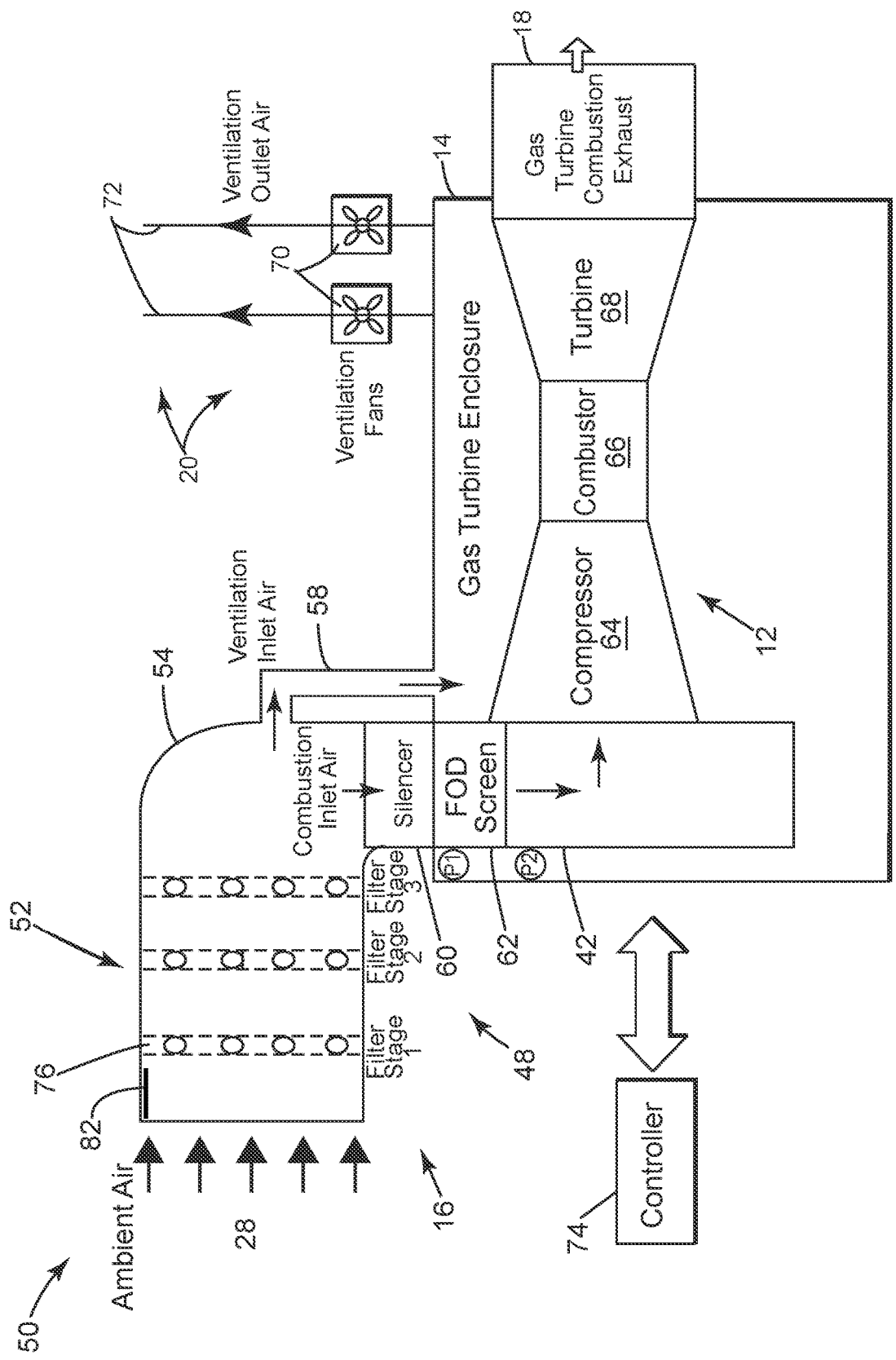
FIG. 3 shows a schematic diagram illustrating an example of the system for preventing icing in the combustion inlet air path of a gas turbine system according to an embodiment of the invention.

Further, it is understood that the air intake system 16 depicted in FIG. 2, as well as FIG. 3 represent only one example of an air intake system that can be implemented with an aeroderivative gas turbine system, and is not meant to limit the various embodiments described herein. Those skilled in the art will appreciate that aeroderivative gas turbine systems can be implemented with an air intake system that takes on a different configuration than that depicted in FIGS. 2 and 3. For example, instead of having a single inlet for receiving the stream of inlet air 28 as depicted in FIGS. 2 and 3, there can be dual inlets that receive the inlet air, as well as multiple inlets to receive the stream of inlet air 28.

Although not explicitly shown in FIG. 2, the gas turbine engine 12 may generally include a compressor, a combustor and a turbine that can operate in the manner previously discussed. That is, the compressor delivers a compressed flow of air to the combustor. The combustor mixes the compressed flow of air with a compressed flow of fuel and ignites the mixture in a chamber to create a flow of combustion gases. The flow of combustion gases is in turn delivered to a turbine to drive the turbine blades to rotate about a shaft along an axis of the gas turbine engine. In this manner, the mechanical work in the turbine can drive a load such as an electrical generator 44 to produce power.

The aeroderivative gas turbine system 22 of FIG. 2 also can include a gas turbine enclosure ventilation exhaust system 20 that can generate an air flow to purge the gas turbine enclosure 14 of heat and exhaust products from the gas turbine engine 12. It is understood that the aeroderivative gas turbine system 22 depicted in FIG. 2, as well as the other figures disclosed herein that illustrate gas turbine systems of other embodiments, can include a number of other components not specifically referenced or shown in the figures. For example, the aeroderivative gas turbine system 22 in FIGS. 2 and 3 can include, but is not limited to, a number of skids (e.g., a water injection skid, a liquid fuel boost skid, a compressor discharge pressure (CDP) skid, and a CDP cooler skid) and struts to support the gas turbine engine.

Further, it is understood that the aeroderivative gas turbine system 22 of FIG. 2, as well as other figures (FIG. 3) disclosed herein represent only one example of an aeroderivative gas turbine system and those skilled in the art will appreciate that aeroderivative gas turbine systems can be configured according to any of a number of possibilities. For example, an aeroderivative gas turbine system can be configured as a multi shaft design that can include a low-pressure compressor, a high-pressure compressor, and a power turbine in a multi shaft design. Thus, the system described herein for preventing icing in the combustion inlet air path of the gas turbine system should not be limited to the aeroderivative gas turbine system 22 depicted in FIGS. 2 and 3.

The various embodiments of the present invention are directed to preventing icing in the combustion inlet air path of a gas turbine system, such as for example, an aeroderivative gas turbine system. FIG. 3 shows a schematic diagram of a system 48 for preventing icing in the combustion inlet air path of a gas turbine system 50 according to an embodiment of the invention. As discussed above with respect to FIGS. 1 and 2, the gas turbine system 50 includes a gas turbine engine 12 disposed in a gas turbine enclosure 14, an air intake system 16 that receives a stream of inlet air 28 and provides filtered air to the gas turbine engine 12 for combustion. A gas turbine combustion exhaust 18 releases exhaust gases from the gas turbine engine 12, and a gas turbine enclosure ventilation exhaust system 20 purges and ventilates heat and exhaust products from the gas turbine engine 12.

FIG. 3 shows that the air intake system 16 can include an air filter inlet house 52 that removes moisture and/or particulate matter (such as dust and/or debris) from the intake air 28 channeled to the gas turbine engine 12. In one embodiment, the air filter inlet house 52 can include a multiple of filter stages (e.g., Filter Stage 1, Filter Stage 2, Filter Stage 3) to filter the intake air 28 provided to the gas turbine engine 12. As shown in FIG. 3, the filter stages can be disposed in series in the air filter inlet house 52 such that Filter Stage 1 applies a first filter to the intake air 28, while, Filter Stage 2, which is downstream of Filter Stage 1, and Filter Stage 3, which is downstream of Filter Stage 2, each applies an additional filtering of the intake air 28 to further remove any moisture and/or particulate matter that may remain after filtering in the filter stage upstream therefrom.

It is understood that the number of filter stages (Filter Stage 1, Filter Stage 2, Filter Stage 3) depicted in FIG. 3 are illustrative of a number of filter stages that may be deployed in the air filter inlet house 52, and is not meant to be limiting. Those skilled in the art will appreciate that the air filter inlet house 52 can have more or less filter stages than that what is depicted in FIG. 3.

Each of the filter stages in the air filter inlet house 52 can include any suitable filtering component that may be configured to remove and/or filter out large and small particles and/or debris that may be found in the intake air 28, such as, sand grains, dirt, rain drops, snow, and other undesirable debris. In one embodiment, each of the filter stages in the air filter inlet house 52 can include an array of hydrophobic pulse filters 76.

It is understood that the air filter inlet house 52 can be configured to include other filtering components. For example, the air filter inlet house 52 can include vane filters (e.g., weather hoods and/or screens) to remove and/or filter out large particles and/or debris that may be found in the intake air 28. For example, in one embodiment, the air filter inlet house 52 can be configured with vane filters formed at an inlet that receives the intake air 28 to remove and/or filter out large particles and/or debris, while the Filter Stages 1, 2 and 3 can filter out the smaller or finer particles that remain in the intake air 28.

The air intake system 16 further includes a clear air duct 54 in fluid communication with the air filter inlet house 52. As used herein, "in fluid communication with" means that there is a passage that allows a fluid to flow. In one embodiment, the clean air duct 54 can receive the filtered air from the air filter inlet house 52. The air in the clean air duct 54 can then be divided into combustion inlet air that goes to the compressor 64 of the gas turbine engine 12, and ventilation inlet air that is supplied to the gas turbine enclosure 14. In one embodiment, the inlet plenum/volute 42 (a combustion inlet air duct), that is in fluid communication with the clean air duct 54, provides the combustion inlet air to a compressor 64 of the gas turbine engine 12, while a ventilation inlet air bypass conduit 58, that is in fluid communication with the clean air duct 54, supplies the ventilation inlet air to the gas turbine enclosure 14. To this extent, the clear air duct 54 receives the filtered intake air 28 from the last filter stage (e.g., Filter Stage 3) of the air filter inlet house 52, which the inlet plenum/volute 42 provides as combustion inlet air to the compressor 64, and the ventilation inlet air bypass conduit 58 supplies as ventilation inlet air into the gas turbine enclosure 14.

A silencer 60 and a FOD screen 62 are other components that can form part of the air-intake system 16 as depicted in FIG. 3. The silencer 60 can be an assembly formed from a plurality of silencer panels that is located downstream of the air filter inlet house 52, about the clear air duct 54, to reduce the "noise" associated with the intake air 28 transmitted through the air intake system 16. The FOD screen 62 can be used to deflect contaminants or debris (e.g., weld slag). The stream of inlet air 28 then may pass through the inlet plenum/volute 42 and into the gas turbine engine 12 as combustion inlet air for compression and combustion.

It is understood that the FOD screen can be implemented in a number of different locations depending on the aeroderivative gas engine package, and thus, the placement of the FOD screen 62 is not meant to be limiting. For example, the FOD screen 62 can be placed in a number locations before the compressor 64, but downstream of the filters. In one embodiment, the FOD screen 62 can be coupled to a wall (e.g., annular wall) of the housing of the silencer 60. In certain embodiments, the FOD screen 62 can be coupled to other walls in the combustion inlet air path that are not part of the housing of the silencer 60. In other embodiments, the FOD screen 62 can be coupled to an upstream end of an engine bell mouth defining the inlet of the gas turbine, engine 12.

FIG. 3 shows the gas turbine engine 12 with the compressor 64, a combustor 66, and a turbine 68 that can operate in the manner previously discussed. That is, the compressor 64 delivers a compressed flow of air to the combustor 66. The combustor 66 mixes the compressed flow of air with a compressed flow of fuel and ignites the mixture in a chamber to create a flow of combustion gases. The flow of combustion gases is in turn delivered to the turbine 68 to drive the turbine blades to rotate about a shaft along an axis of the gas turbine engine 12. In this manner, the mechanical work in the turbine can drive a load such as an electrical generator to produce power.

As shown in FIG. 3, the gas turbine system 50 can further include a gas turbine enclosure ventilation exhaust system 20 to generate an air flow to purge the gas turbine enclosure 14 of heat and exhaust products from the gas turbine engine 12. In one embodiment, the gas turbine enclosure ventilation exhaust system 20 can include one or more ventilation fans 70 to generate the air flow that purges the gas turbine enclosure 14 of heat and exhaust products from the gas turbine engine 12. Ventilation silencers and ducts 72, in fluid communication with each fan 70, can draw the air flow from the gas turbine enclosure 14 and direct it to ambient as ventilation outlet air.

Although not illustrated in FIG. 3, the gas turbine enclosure ventilation exhaust system 20 can include a ventilation air control damper that can be used to aid in directing the ventilation outlet air to ambient, in one embodiment, the ventilation air control damper, which can be an electronically controlled device, can be configured to also direct the ventilation outlet air from the gas turbine enclosure 14 to one or more air inlet heating ducts that are in fluid communication with a corresponding ventilation conduit 60. In this manner, the ventilation outlet air can be directed back to the air intake system 16 and used to heat the stream of inlet air 28 supplied to the air filter inlet house 52.

The gas turbine system 50 of FIG. 3 can further include a controller 74 that is operatively coupled to the air intake system 16, the gas turbine engine 12, the gas turbine combustion exhaust 18, and the gas turbine enclosure ventilation exhaust system 20. In this manner, the controller 74 can control the operation of various components associated with each of these parts of the gas turbine system 50. For example, one or more sensors may be disposed about the gas turbine engine 12, the air intake system 16, the gas turbine combustion exhaust 18, and the gas turbine enclosure ventilation exhaust system 20 to detect any of a number of conditions. The sensors can be in communication with the controller 74 to provide measurements representative of any number of parameters that the sensors are configured to detect. A non-limiting list of sensors that are suitable for use include temperature sensors, pressure sensors, flow sensors, and humidity sensors.

In one embodiment, one or more temperature sensors can be disposed about the air intake system 16 to obtain temperature measurements about the air intake system. For example, an ambient temperature sensor can be disposed about the inlet of the air intake system 16, while an air intake system temperature sensor can be disposed within the air intake system. To this extent, the ambient temperature sensor can obtain ambient temperature measurements about the inlet of the air intake system 16, while the air intake system temperature sensor can obtain temperature measurements within the air intake system. In one scenario, the controller 74 can use these temperature measurements, along with humidity measurements obtained from humidity sensors located about the air intake system 16 to determine the presence of icing conditions.

As noted above, the various embodiments of the present invention are directed to preventing icing in the combustion inlet air path of a gas turbine system. The system 48 depicted in FIG. 3 prevents icing in the combustion inlet air path of the gas turbine system 50 without the use of an anti-icing heating system (e.g., heater coils and the use of the ventilation outlet air to heat the intake air) to heat the stream of inlet air 28. In particular, the system 48 can prevent the formation of ice in the combustion inlet air path of the gas turbine system 50 through the use of the array of hydrophobic pulse filters 76 in the air filter inlet house 52, along with at least one component in the combustion inlet air path between the air filter inlet house 52 and the inlet of the gas turbine engine 12 that has a surface with an anti-icing or icephobic coating to prevent ice from forming on the at least one component. More specifically, the controller 74 can direct the array of hydrophobic pulse filters 76 to be pulsed in response to determining the presence of ice on the filters or that icing conditions exist. Pulsing the filters 76 will dislodge any ice from the filters, preventing it from being ingested and traveling to the inlet of the gas turbine engine 12.

One aspect of the anti-icing properties that is provided by the system 48 are attained due to the pulse filters 76 being hydrophobic. In particular, the hydrophobic pulse filters 76 block liquid water from passing through the air filter inlet house 52 into the combustion inlet air path and onto the inlet of the gas turbine engine. This blocking of liquid water from passing into the combustion inlet air path prevents ice accretion that can lead to icing in parts or components of the combustion inlet air path.

Even though the hydrophobic pulse filters 76 block water that can lead to icing in the combustion inlet air path, icing conditions can still develop when the humidity and temperature reach certain levels. As noted above, icing conditions can develop on components in the combustion inlet air path when ambient operating conditions include at least 70% humidity and a temperature that is below 40 degrees Fahrenheit (F). The system 48 addresses this icing concern that can arise when conditions include at least 70% humidity and a temperature that is below 40 degrees F. by applying the anti-icing or icephobic coating to at least one component in the combustion inlet air path. To this extent, the anti-icing coating applied to at least one component in the combustion inlet air path prevents ice from forming when operating conditions include at least 70% humidity and a temperature that is below 40 degrees F.

In general, the anti-icing coating applied to the at least one component in the combustion inlet air path can prevent the formation of ice due to the coating having one or more properties that can include, but are not limited to, preventing ice nucleation (the way water vapor is triggered into freezing), lowering the freezing temperature for water that touches a surface containing the coating, making it difficult for ice to grab onto the surface containing the coating (low ice adhesion), and super-hydrophobicity in cold and humid climates.

The anti-icing coating can comprise any of a number of commercially available anti-icing or icephobic coatings including, but not limited to icephobic/super hydrophobic and nano-textured super hydrophobic coatings that can inhibit the accretion of ice. A non-exhaustive list of anti-icing or icephobic coatings that are suitable for use in the various embodiments include, but are not limited to, AEROKRET 21, NEINCE, ADAPTIVE SURFACE TECHNOLOGIES' SLIP FOUL PROJECT, LUNA INNOVATIONS' GENTOO, BATTEL HEATCOAT, ECOLOGICAL COATINGS' 3000 Series icephobic coatings, KISS POLYMERS' KISS-COTE, NEI'S NANOMYTE coating, NBD NANO's REPELSHELL, and OPUS MATERIALS TECHNOLOGIES' ICEMART. Other commercially available anti-icing or icephobic coatings are available from KYNAR, HYGRATEK LLC, FRAUNHOFER IGB, and EQUINOR ASA. In addition to being effective anti-icing coatings, these coatings exhibit strong durability properties that make them suitable for use in gas turbine applications in which it is desirable to having coatings that can withstand the impact of debris that may arise during the usual operation of a gas turbine system.

In one embodiment, the FOD screen 62 is a particular component in the combustion inlet air path between the air filter inlet house 52 and the inlet of the gas turbine engine 12 that can have an anti-icing coating. In general, the FOD screen 62, which can collectively include one or more screen, including an air sock placed over the screen(s) can be formed from any of a number of materials. A non-limiting list of materials that are suitable for use in the screen(s) and the air sock of the FOD screen 62 can include, but is not limited to, a woven mesh of a flexible, non-metal material (e.g., mesh wires), a metal material, nylon, para-aramid synthetic fibers (e.g., Kevlar®, Twaron®, etc.) and combinations thereof. To this extent, these materials can enable each screen in the FOD screen 62 including the sock to block debris or foreign objects from entering the inlet of the gas turbine engine 12.

Figure 4A:
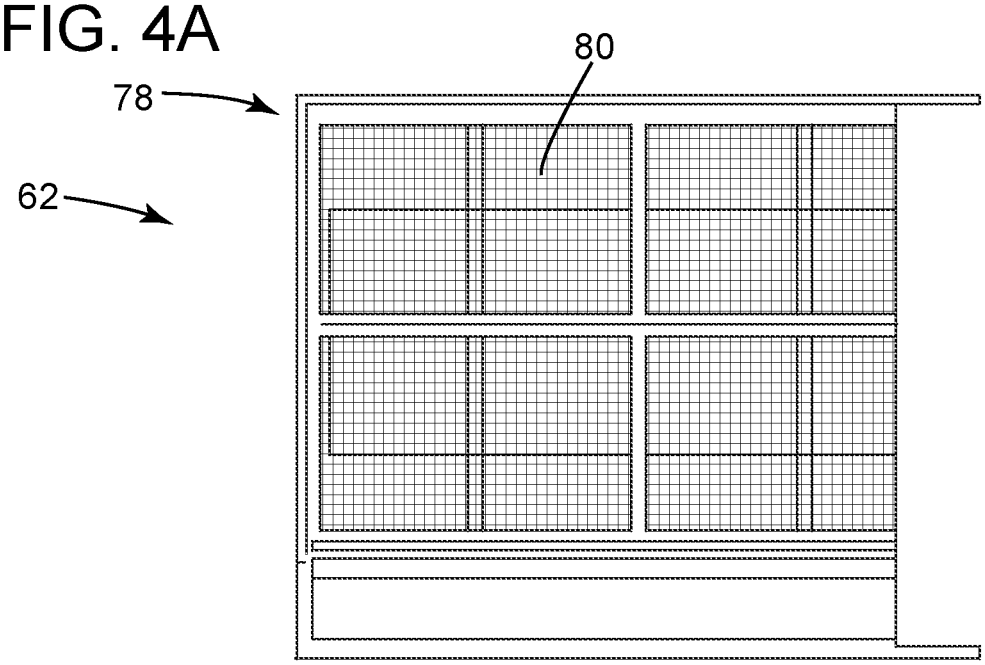
FIGS. 4A-4C show various views of a foreign object damage (FOD) screen depicted in FIGS. 2 and 3 in which an anti-icing coating can be applied according to an embodiment of the invention.
Figure 4B:
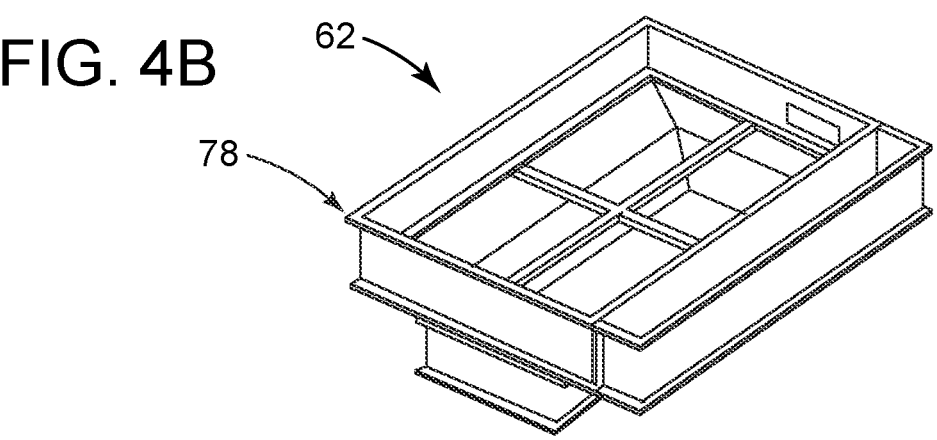
Figure 4C:
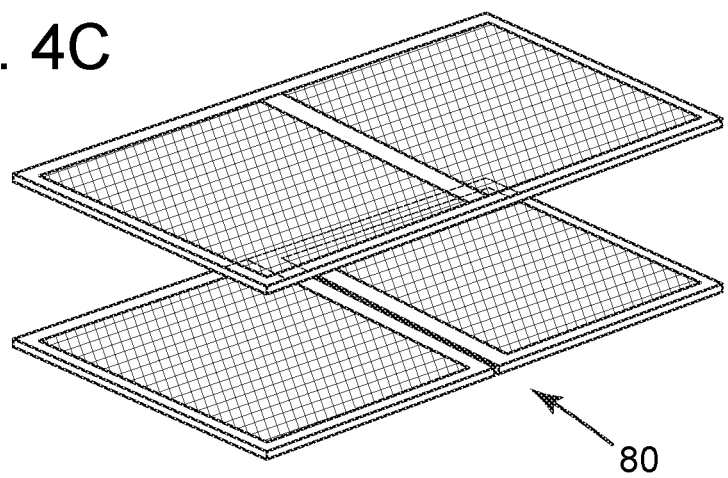

FIGS. 4A-4C show various views of an example of the FOD screen 62 in which an anti-icing coating can be applied according to an embodiment of the invention. As shown in in FIG. 4A, the FOD screen 62 can comprise a frame structure 78 with a screen 80 enclosed by the frame structure. In one embodiment, the frame structure 78 can be formed from rails, support rods, or the like. In one embodiment as shown in FIGS. 4A and 4B, the rails can extend horizontally and vertically across to define individual segments of sub-frame structures each having a mesh screen. With this configuration, the anti-icing coating can be applied on the surfaces of the screen 80 that are in the combustion inlet air path.

As mentioned previously, the FOD screen 62 can include more than one screen 80, as well as an air sock placed over the screen(s). FIG. 4C shows an example of two screens 80 that can be placed over one another and placed in the frame structure 78 depicted in FIGS. 4A and 4B. With this configuration, the anti-icing coating can be applied on the surfaces of both of the screens 80.

In one embodiment, the anti-icing coating can be applied to the screen(s) and sock of the FOD screen 62 by using any of a number of well-known methodologies. In one embodiment, the anti-icing coating can be applied to each of the screen(s) and sock of the FOD screen 62 by using a spray and dip method. The regions of the screen(s) and sock of the FOD screen that are applied with the anti-icing coating can include locations where there is direct particle impact and locations without direct particle impact. Applying the anti-icing coating to the screen(s) 80 and sock transforms the FOD screen 62 to an icephobic FOD screen that inhibits the formation of ice that can lead to damage of the gas turbine engine 12 and possible shut down of the turbine.

Although the FOD screen 62 is described and depicted with a square or rectangular shape, it is understood that the FOD screen can take the form of other shapes that include, but are not limited to elliptical shapes. The shape of the FOD screen can depend on a variety of factors that include the shape of the ducts used in the combustion inlet air path, the location of FOD screen (e.g., against the wall of the silencer, abutting the bell mouth of the inlet of the gas turbine engine, etc.).

In one embodiment, the controller 74 can monitor the effectiveness of the anti-icing coating that is provided to the FOD screen 62. For example, since ice on the FOD screen 62 can lead to a differential pressure across the FOD screen, a differential pressure measurement obtained from FOD screen 62 can be used as an indication of the presence of ice on the screen. In one embodiment, the system 48 can further include at least one differential pressure sensor operatively coupled to the FOD screen 62 to obtain a differential pressure measurement across the FOD screen. For example, FIG. 3 shows a differential pressure sensor P1 and a differential pressure sensor P2 located on opposing sides of the FOD screen 62 in the combustion inlet air path. In this manner, the controller 74 can obtain the differential pressure measurements from the differential pressure sensors P1 and P2. If the controller 74 determines that there is a differential pressure increase across the FOD screen 62 (i.e., a reduction in the air flow going through the turbine engine 12), then the controller can correlate this to ice formation, assuming that the differential pressure increase is occurring in an environment in which icing conditions are present.

Other components in the combustion inlet air path between the air filter inlet house 52 and the inlet of the gas turbine engine 12 can have an anti-icing coating applied to a surface to prevent the formation of ice. These other components can include, but are not limited to, the silencer 60, the inlet plenum/inlet volute 42 that supply the combustion inlet air to the inlet of the gas turbine engine, the inlet guide vanes that direct the combustion inlet air to the inlet of the gas turbine engine 12, and the inlet struts that support the combustion inlet air duct 56. Applying an anti-icing coating to one or more of these components can complement the anti-icing coating applied to the FOD screen 62.

The configuration of the system 48 that is depicted in FIG. 3 that includes the array of hydrophobic pulse filters 76 along with at least one component (e.g., the FOD screen) in the combustion inlet air path between the air filter inlet house 52 and the inlet of the gas turbine engine 12 that has a surface with an anti-icing coating, allows the various embodiments of the present invention to eliminate the possibility of ice accretion. This allows the gas turbine engine to operate continuously during icing conditions.

In addition, the configuration that is provided by system 48 obviates the need to utilize an anti-icing system to heat the intake air, thereby maximizing efficiency and cost effectiveness of the gas turbine system 50. Nevertheless, for those gas turbine systems already implemented with an anti-icing system, the system 48 can be utilized to supplement the anti-icing features provided by those anti-icing systems by providing enhanced anti-icing in the combustion inlet air path. Alternatively, the system 48 can be used in place of those anti-icing systems already implemented in a gas turbine system. To this extent, the system 48 can be utilized to avoid parasitic loads that are associated with using these anti-icing systems.

In one embodiment, the anti-icing that is provided by the system 48 can be enhanced by configuring a heating unit about the combustion inlet air path that can have ice formation when icing conditions are present. For example, FIG. 3 shows a schematic representation of an optional heating unit 82 that can be operatively coupled to the air filter inlet house 52. In one embodiment, the heating unit 82 can be placed after the coil section (not illustrated) and the array of hydrophobic pulse filters 76. To this extent, the controller 74 can direct the heating unit 82 to apply heat to the air intake system 16 in response to determining the presence of icing conditions.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A system, comprising: a gas turbine engine; an air intake system to intake air for supply to the gas turbine engine, the air intake system comprising an air filter inlet house to filter the intake air, wherein the air filter inlet house includes at least one filter stage having an array of pulse filters, with each of the pulse filters being hydrophobic, and a combustion inlet air path in fluid communication with the air intake system and the gas turbine engine, the combustion inlet air path receiving the filtered air from the air filter inlet house and supplying the filtered air as combustion inlet air to an inlet of the gas turbine engine, wherein a surface of at least one component in the combustion inlet air path comprises an anti-icing coating to prevent ice from forming on the at least one component.

The system of the preceding clause, wherein the at least one component comprises a foreign object damage (FOD) screen.

The system of any of the preceding clauses, wherein the FOD screen comprises a frame structure with at least one screen enclosed by the frame structure, wherein the anti-icing coating is applied to a surface of each screen.

The system of any of the preceding clauses, wherein the at least one component comprises a foreign object damage (FOD) screen and other components in the combustion inlet air path that includes one or more of weather hoods mounted on the air filter inlet house, a silencer that reduces the noise associated with the intake air, an inlet plenum/volute that supply the combustion inlet air to the inlet of the gas turbine engine, inlet guide vanes that direct the combustion inlet air to the inlet of the gas turbine engine, and inlet struts that support the inlet plenum/volute that supply the combustion inlet air towards the inlet of the gas turbine engine.

The system of any of the preceding clauses, further comprising a heating unit operatively coupled to the air filter inlet house.

The system of any of the preceding clauses, further comprising at least one differential pressure sensor operatively coupled to the at least one component, wherein the at least one differential pressure sensor obtains a differential pressure measurement across the at least one component, the differential pressure measurement providing an indication of ice formation on the at least one component.

The system of any of the preceding clauses, further comprising a controller to monitor the differential pressure measurement to determine ice formation on the at least one component.

The system of any of the preceding clauses, wherein the gas turbine engine comprises an aeroderivative gas turbine.

A gas turbine system, comprising: a gas turbine engine; an air intake system to intake air for supply to the gas turbine engine, the air intake system comprising an air filter inlet house to filter the intake air, wherein the air filter inlet house includes at least one filter stage having an array of pulse filters, with each of the pulse filters being hydrophobic, a combustion inlet air path in fluid communication with the air intake system and the gas turbine engine, the combustion inlet air path receiving the filtered air from the air filter inlet house and supplying the filtered air as combustion inlet air to an inlet of the gas turbine engine; and a foreign object damage (FOD) screen in the combustion inlet air path between the air filter inlet house and the inlet of the gas turbine engine to prevent debris from entering the inlet of the gas turbine engine, wherein a surface of FOD screen comprises an anti-icing coating to prevent ice formation thereon.

The system of the preceding clause, wherein the FOD screen comprises a frame structure with at least one screen enclosed by the frame structure, wherein the anti-icing coating is applied to a surface of each screen.

The system of any of the preceding clauses, wherein the anti-icing coating is applied to one or more components in the combustion inlet air path that includes weather hoods mounted on the air filter inlet house, a silencer that reduces the noise associated with the intake air, an inlet plenum/volute that supply the combustion inlet air to the inlet of the gas turbine engine, inlet guide vanes that direct the combustion inlet air to the inlet of the gas turbine engine, and inlet struts that support the inlet plenum/volute that supply the combustion inlet air towards the inlet of the gas turbine engine.

The system of any of the preceding clauses, further comprising a heating unit operatively coupled to the air filter inlet house.

The system of any of the preceding clauses, further comprising at least one differential pressure sensor operatively coupled to the FOD screen, wherein the at least one differential pressure sensor obtains a differential pressure measurement across the FOD screen, the differential pressure measurement providing an indication of ice formation on the FOD screen.

The system of any of the preceding clauses, further comprising a controller to monitor the differential pressure measurement to determine ice formation on the FOD screen.

The system of any of the preceding clauses, wherein the gas turbine engine comprises an aeroderivative gas turbine.

A method for preventing icing in the combustion inlet air path of a gas turbine system having a gas turbine engine, an air intake system to intake air for supply to the gas turbine engine, and a combustion inlet air path to supply combustion inlet air to an inlet of the gas turbine engine, the method comprising: filtering the intake air in the air intake system with an air filter inlet house including at least one filter stage having an array of hydrophobic pulse filters; supplying the filtered air as combustion inlet air to the inlet of the gas turbine engine; and applying an anti-icing coating to a surface of at least one component in a path of the combustion inlet air between the air filter inlet house and the inlet of the gas turbine engine to prevent ice from forming on the at least component.

The method of the preceding clause, wherein the at least one component comprises a foreign object damage (FOD) screen.

The method of any of the preceding clauses, further comprising applying the anti-icing coating to one or more components in the combustion inlet air path that includes weather hoods mounted on the air filter inlet house, a silencer that reduces the noise associated with the intake air, an inlet plenum/volute that supply the combustion inlet air to the inlet of the gas turbine engine, inlet guide vanes that direct the combustion inlet air to the inlet of the gas turbine engine, and inlet struts that support the inlet plenum/volute that supply the combustion inlet air towards the inlet of the gas turbine engine.

The method of any of the preceding clauses, further comprising heating the air filter inlet house.

The method of any of the preceding clauses, further comprising obtaining a differential pressure measurement across the at least one component, the differential pressure measurement representative of an indication of ice formation on the at least one component.

What is claimed is:

1. A gas turbine system, comprising:
a gas turbine engine;
an air intake system to intake air for supply to the gas turbine engine, the air intake system comprising an air filter inlet house to filter the intake air, wherein the air filter inlet house includes at least one filter stage having an array of pulse filters, with each of the pulse filters being hydrophobic,
a combustion inlet air path in fluid communication with the air intake system and the gas turbine engine, the combustion inlet air path receiving filtered air from the air filter inlet house and supplying the filtered air as combustion inlet air to an inlet of the gas turbine engine;
a foreign object damage (FOD) screen in the combustion inlet air path between the air filter inlet house and the inlet of the gas turbine engine to prevent debris from entering the inlet of the gas turbine engine, wherein the FOD screen includes one or more mesh screens and an air sock placed over the one or more mesh screens, the one or more mesh screens enclosed in a frame structure having horizontally and vertically extending rails defining individual segments of sub-frame structures formed by intersections of the horizontally extending rails with the vertically extending rails, each individual segment of sub-frame structures enclosing portions of the one or more mesh screens, wherein a surface of each of the one or more mesh screens in the individual segments of sub-frame structures and the air sock placed over the one or more screens comprises an anti-icing coating to prevent ice formation thereon, the anti-icing coating applied to each of the one or more mesh screens in the individual segments of sub-frame structures and the air sock in locations where there is direct particle impact with particles flowing through the combustion inlet air path and locations without direct particle impact with the particles flowing through the combustion inlet air path;
at least one differential pressure sensor operatively coupled to the FOD screen, wherein the at least one differential pressure sensor obtains a differential pressure measurement across the FOD screen, the differential pressure measurement providing an indication of ice formation on the FOD screen; and
a controller operatively coupled to the at least one differential pressure sensor, the controller configured to monitor the differential pressure measurement across the FOD screen to determine ice formation on the FOD screen.

2. The gas turbine system of claim 1, wherein the anti-icing coating is further applied to one or more components in the combustion inlet air path that include weather hoods mounted on the air filter inlet house, a silencer that reduces noise associated with the intake air, an inlet plenum volute that supply the combustion inlet air to the inlet of the gas turbine engine, inlet guide vanes that direct the combustion inlet air to the inlet of the gas turbine engine, and inlet struts that support the inlet plenum/volute that supply the combustion inlet air towards the inlet of the gas turbine engine.

3. The gas turbine system of claim 1, further comprising a heating unit directly coupled to the air filter inlet house to heat the intake air.

4. The gas turbine system of claim 1, wherein the gas turbine engine comprises an aeroderivative gas turbine.

5. The gas turbine system of claim 1, wherein the anti-icing coating is selected from the group consisting of icephobic/super hydrophobic and nano-textured super hydrophobic coatings.

6. A method for preventing icing in a gas turbine system having a gas turbine engine, an air intake system to intake air for supply to the gas turbine engine, and a combustion inlet air path to supply combustion inlet air from the air intake system to an inlet of the gas turbine engine, the method comprising:
filtering the intake air in the air intake system with an air filter inlet house including at least one filter stage having an array of hydrophobic pulse filters;
supplying filtered air as combustion inlet air to the inlet of the gas turbine engine;
applying an anti-icing coating to a surface of at least one component in the combustion inlet air path between the air filter inlet house and the inlet of the gas turbine engine upstream of a first stage of blades in the gas turbine engine to prevent ice from forming on the at least one component, wherein the at least one component comprises a foreign object damage (FOD) screen, wherein the FOD screen includes one or more mesh screens and an air sock placed over the one or more mesh screens, the one or more mesh screens enclosed in a frame structure having horizontally and vertically extending rails defining individual segments of sub-frame structures, each individual segment of sub-frame structures enclosing portions of the one or more mesh screens, wherein a surface of each of the one or more mesh screens in the individual segments of sub-frame structures and the air sock placed over the one or more screens comprises the anti-icing coating, wherein the anti-icing coating is applied to each of the one or more mesh screens in the individual segments of sub-frame structures and the air sock in locations where there is direct particle impact with particles flowing through the combustion inlet air path and locations without direct particle impact with the particles flowing through the combustion inlet air path;
obtaining a differential pressure measurement across the FOD screen, the differential pressure measurement representative of an indication of ice formation on the at least one component; and
monitoring the differential pressure measurement across the FOD screen to determine ice formation on the FOD screen.

7. The method of claim 6, further comprising applying the anti-icing coating to one or more additional components in the combustion inlet air path that include weather hoods mounted on the air filter inlet house, a silencer that reduces noise associated with the intake air, an inlet plenum/volute that supply the combustion inlet air to the inlet of the gas turbine engine, inlet guide vanes that direct the combustion inlet air to the net of the gas turbine engine, and inlet struts that support the inlet plenum/volute that supply the combustion inlet air towards the inlet of the gas turbine engine.

8. The method of claim 6, further comprising heating the intake air in the air filter inlet house.

9. The method of claim 6, wherein the anti-icing coating is selected from the group consisting of icephobic/super hydrophobic and nano-textured super hydrophobic coatings.

* * * * *